Sept. 3, 1940.  W. A. DUNDAS ET AL  2,213,668
METHOD OF AND APPARATUS FOR DISPOSING OF SEWAGE WASTE
Original Filed Aug. 26, 1933  2 Sheets-Sheet 2
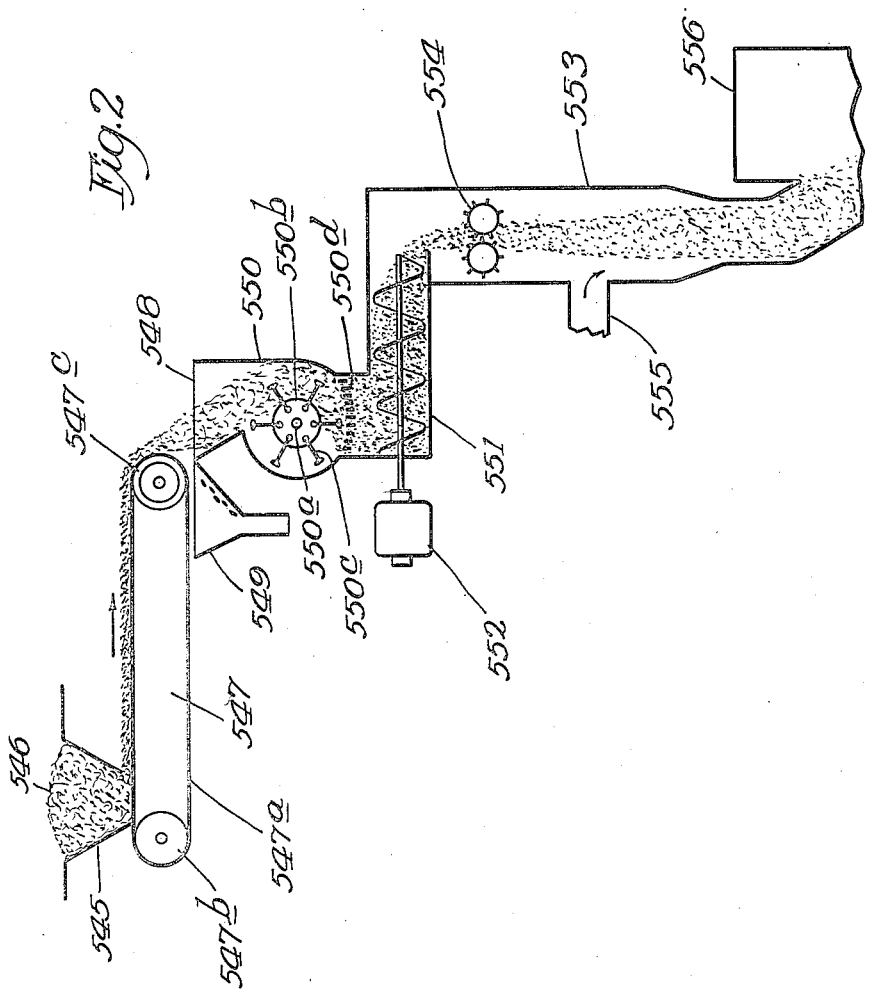

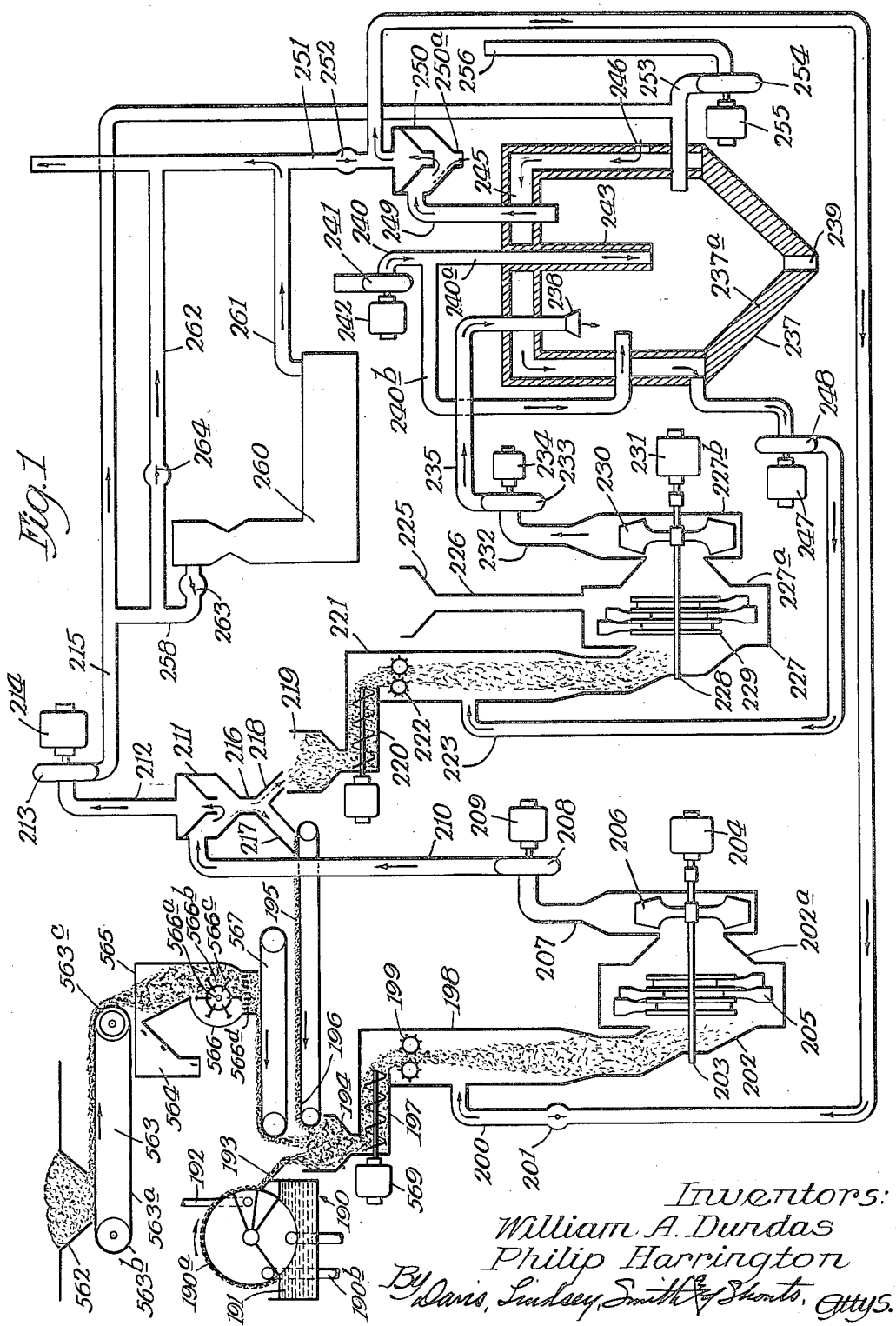

Patented Sept. 3, 1940

2,213,668

UNITED STATES PATENT OFFICE 2,213,668

METHOD OF AND APPARATUS FOR DISPOSING OF SEWAGE WASTE

William A. Dundas, Winnetka, and Philip Harrington, Chicago, Ill.

Original application August 26, 1933, Serial No. 686,926. Divided and this application October 22, 1937, Serial No. 170,465

2 Claims. (Cl. 110—15)

This invention relates to improvements in methods of and apparatus for the disposal of sewage, garbage, and other wastes, and its purpose is to provide means for accomplishing this object more efficiently and economically than has heretofore been possible by the methods commonly in use. Although particularly adapted for the treatment of sewage waste or garbage or mixtures of these wastes, the invention may be employed with advantage in the disposal of various other wastes or mixtures thereof. The present application is a division of our copending application Ser. No. 686,926, filed August 26, 1933.

Sewage consists of a mixture of water, minerals and other inert inorganic materials and organic materials either in suspension or solution, and garbage and rubbish are similar in that they usually include mixtures of organic and inorganic material and water. The problem of sewage disposal involves the separation of the water from the more or less solid ingredients and the disposition of these solid ingredients in an economical manner without creating a nuisance in the region where the operation is carried on. All presently known methods for the purification and treatment of sewage and the disposal of the waste products of such methods consist of separating more or less perfectly the water from the other materials contained in the sewage after which the water is ordinarily run off to open streams or bodies of water and the other separated materials are disposed of in various ways. These waste materials, commonly known as sludge, screenings and grit, consist of the inorganic and organic ingredients of the sewage together with some water which has not been separated by the initial treatment. The organic materials consist mainly of vegetable and animal matter, including a large percentage of volatile and combustible material, while the inorganic materials are largely in the form of inert minerals. These more or less solid ingredients of the sewage are ordinarily disposed of either by mechanical dewatering and processing into fertilizer for which the market is limited, or by digestion followed by partial dewatering carried on in drying beds and again followed by dumping on waste land, or by partial digestion and evaporation in lagoons, or by dumping the material at sea or in open rivers and lakes. Where the sewage wastes are disposed of in lagoons or on drying beds, the disposal is usually uncertain, seasonal and intermittent, being dependent upon weather conditions and requiring the storage of the sewage waste for long periods before it can be spread out on the drying beds for the evaporation of the water carried therein. In addition, these methods of disposal of the organic and inorganic ingredients of the sewage waste do not reduce the materials to an inert form and are unsanitary and give rise to the possibility of undesirable odors and nuisances over large areas. None of these methods fully utilizes the combustible properties or contents found in all sewage waste materials, and which are found in the waste materials in sufficient quantity to make them practically capable of supporting combustion without the addition of any appreciable quantities of supplementary fuel when incinerated by the methods described in the following specification.

In our copending application above referred to, in which the present invention is broadly claimed, there is disclosed a method or methods and several forms of apparatus by which sewage waste and the like is disposed of in a continuous process by drying the waste material and then burning it, the hot gases of combustion being utilized to effect the drying of further wet material and the offensive odors given off by the material being also preferably destroyed by burning the gases or subjecting them to a high temperature treatment, thus leaving the inert ash as the only solid residue resulting from the process. By the practice of that invention, and that of the present application, the waste material which may contain a relatively large percentage of moisture is subjected to a dewatering step and the remaining wet solid material is then reduced to a finely divided condition and subjected while in motion to the action of a hot drying medium, such as heated air or hot gases of combustion, thereby producing a continuing supply of dried material which is incinerated in a closed chamber, thereby producing hot gases which are utilized for supplying heat in the drying stage. A portion of the dried material, produced in the drying stage, is preferably returned and mixed with the incoming wet material in advance of that stage in order to reduce the proportionate moisture content of the mixture.

More particularly, the present invention relates to an embodiment of the improved process and apparatus described above wherein means are provided for comminuting, drying and burning a plurality of different waste materials, either simultaneously as a mixture or separately. For example, sewage waste and garbage may be mixed together in an early stage of the process and the mixture is then comminuted and subjected to the action of a drying medium, preferably while in suspension therein, preliminary to being burned. Garbage ordinarily contains less moisture than sewage waste and, by mixing the two wastes together, the average moisture content of the mixture is reduced as compared with that of the sewage waste alone, but it is usually preferable to effect a further reduction of the proportionate moisture content of the mixture by mixing some dry material from a later stage of the process with the incoming wet material. Garbage usually contains a considerable quantity of metallic material which, if allowed to remain therein, would interfere with the operation of the apparatus, and improved means are therefore provided for removing the metallic particles, as far as possible, before the garbage waste reaches the comminuting and drying stages.

A further feature of the invention is the provision of improved means and methods for disposing of the obnoxious gases and vapors given off by the waste material. This may preferably be accomplished by burning the gases in a furnace but means are also provided for cleaning and purifying the gases and, when conditions justify it, some of the gases may be vented to the atmosphere.

Other objects and advantages of the invention relate to various details of the improved method and to features of the apparatus which will appear more fully hereinafter. The nature of the invention will be understood from the following specification taken with the accompanying drawings in which one form of apparatus embodying the invention and adapted for use in practicing the improved method is illustrated together with a modification of a portion of this apparatus. In the drawings, Figure 1 is a diagrammatic view, partially in section, showing one form of apparatus embodying the present invention, wherein means are provided for mixing together, drying and burning two different forms of waste material; and Fig. 2 is a diagrammatic sectional view similar to that of a portion of Fig. 1 illustrating a modified form of apparatus which may be used in the early stages of the process when garbage alone is to be treated.

In Fig. 1 of the drawings there is illustrated a form of apparatus which is particularly adapted for the simultaneous treatment of both sewage waste and garbage, although it may be used for treating any one form of waste alone if desired. Assuming that sewage waste and garbage are to be mixed in the first stage of the process, the sewage waste 191, containing a large percentage of water, for example, eighty per cent or more, is delivered in a fluid state to the tank of a rotary vacuum type filter 190. This vacuum filter includes a rotary screen cylinder 190ª having its interior divided into chambers by radial division walls and having pipes 190b connected with a source of suction so that a vacuum is created in the chambers when they are at certain points in their travel, thus causing the solid waste material in the tank to adhere to the peripheral screen surface of the cylinder. A pipe 192, connected with a source of compressed air, communicates with each chamber as it approaches the scraper 193, so that the waste material is released from the cylinder and removed therefrom by the scraper to fall by gravity into the hopper 194. This hopper is also adapted to receive a quantity of garbage or other waste which is discharged therein by an endless belt conveyor 567, and, in addition, a quantity of dried waste 195, from a succeeding stage of the process, is returned by a belt conveyor 196 and discharged into the hopper 194.

The garbage or other waste to be mixed with the sewage waste is received in a hopper 562 and is delivered thereby to the endless belt 563ª of a magnetic separator 563. This belt passes over pulleys 563b and 563c, the latter of which is provided with magnets around its periphery so that any iron, steel or other magnetizable material contained in the garbage or the like is attracted to the pulley and carried around beneath this pulley at the discharge end of the belt, being thereby separated from the non-metallic waste material which drops into the hopper 565. The magnetizable material which is carried beneath the pulley 563c is finally separated from the belt 563ª when the lower stretch of the belt passes away from the pulley because that automatically increases the length of the path through which the magnetic lines of force must pass to the point where the magnetic force is no longer sufficient to hold these materials and they then drop by gravity into the hopper 564 and are thus separated from the combustible material in the garbage or other waste being treated.

The waste material which is received in the hopper 565 falls downwardly into a pulverizer 566 having mounted therein a power driven shaft 566ª having fixed thereon one or more disks 566b provided with pivoted beaters 566c which normally extend radially outward under the action of centrifugal force and pulverize the waste material as it moves downwardly through the casing of the pulverizer. At the bottom of the pulverizer, the finely divided material passes through a grate 566d onto the endless belt 567 which delivers it into the hopper 194 previously referred to.

In the hopper 194 the garbage waste and the sewage waste are mixed with each other and also, preferably with previously dried material discharged by the belt conveyor 196, and this mixture then passes by gravity into a screw conveyor 197, driven by an electric motor 569, by which the materials are further mixed with each other and then discharged into the upper end of a drying tower where they are further mixed and reduced to a finely divided state by a rotary chopping device 199 or swinging hammers mounted in the upper part of the tower. Hot gases of combustion, are introduced into the tower 198 through a conduit 200 which leads from the furnace in which the waste material is incinerated in a later stage of the process. This conduit may be provided with a damper 201 for controlling the flow of the hot gases into the tower and this damper may be automatically controlled as hereinafter referred to. The hot gases assist in the drying of the waste material as it drops through the tower and the temperature of the gases is reduced by the intermingling thereof with the waste before the mixture reaches the drying and pulverizing mill 202. This mill comprises a main casing 202ª and an auxiliary casing 202b having mounted therein a shaft 203 driven by a motor 204. A series of rotary beaters 205 are mounted on this shaft 203 within the main casing 202ª and a rotary impeller 206 is mounted on the shaft within the auxiliary casing 202b. The waste material is ground up or pulverized within this mill and is projected upwardly by the impeller 206 through a conduit 207 which leads to the intake of a fan 208 driven by the motor 209.

The fan 208 discharges the partially dried and finely divided materials, and the steam and hot gases, upwardly through a conduit 210 which leads to a separating device 211. In this separating device, the gases and the like are separated from the solid material and are drawn upwardly through a conduit 212 by a fan 213, which is driven by a motor 214, and are then discharged by the fan into a conduit 215 and disposed of as hereinafter described. The solid materials drop downwardly by gravity through a conduit 216 and are then divided, a portion being discharged through the branch conduit 217 onto the belt conveyor 196 previously described and the remaining portion being discharged through a conduit 218 into a hopper 219 which feeds a screw conveyor 220. This screw conveyor discharges into the upper end of a drying tower 221 which is similar to the tower 198, being provided at its upper end with rotary chopping devices 222 by which the incoming waste material is further divided into a fine state. A conduit 223 leads into the tower 221 and is adapted to convey thereto hot air which is heated in the jacket of the incinerating furnace as hereinafter described. A hopper 225 for coal or the like is also connected by a conduit 226 with the second stage mill 227 so that if the heat contained in the waste material is not sufficient to maintain the various steps of the process where heat is required, additional fuel may be added and mingled with the waste after it has passed downwardly through the tower 221 into this second stage mill 227 which is similar to the mill 202.

The mill 227 comprises a main casing 227ᵃ and an auxiliary casing 227ᵇ, in the walls of which there is journaled a shaft 228 having mounted thereon in the main casing the rotary beating devices 229 and having secured thereon in the auxiliary casing the rotary impeller 230. The shaft 228 is driven by a motor 231 and the waste material which is dried and reduced to a finely divided state in the mill 227 is discharged by the impeller 230 upwardly through a conduit 232 along with the hot air, steam and gases with which the waste is intermingled. The motion of this mixture is assisted by the action of a fan 233 which is mounted in the conduit and driven by a motor 234. The fan 233 discharges into a conduit 235 which discharges through the upper wall of a furnace 237. A burner 238 is mounted on the lower end of the conduit within the furnace and the material is consumed by combustion as it reaches the furnace with the result that hot gases of combustion are given off and the ash falls onto the lower wall 237ᵃ of the furnace which is constructed in the form of an inverted cone with a discharge opening 239 at its apex. A portion of the air required for combustion in the furnace 237 is supplied through a conduit 240 which may have a fan 241 connected therein and driven by a motor 242 for effecting a positive supply of air. The conduit 240 is preferably divided with one portion 240ᵃ extending downwardly through the hollow baffle wall 243 which projects from the top wall of the furnace chamber with its discharge opening located some distance below the burner. The other branch 240ᵇ of the air conduit discharges inwardly through the side wall of the furnace beneath the burner. The furnace 237 has a double outer wall, thus providing an air space 245 which extends around the furnace and across its top wall. An opening 246 is provided at one side of the furnace for the inflow of atmospheric air and at the other side of the furnace the space 245 communicates with the conduit 223 by which hot air, heated by the furnace, is introduced into the drying tower 221. A fan 247, driven by a motor 248, may be connected in the conduit 223 for causing a positive flow of air to the drying tower.

The gases of combustion produced in the furnace chamber pass upwardly through a conduit 249 into a separator 250 by which the dust and the like is separated and permitted to drop by gravity through the lower opening 250ᵃ, while the gases pass upwardly and are delivered either to the stack 251 or to the previously described conduit 200 by which the hot gases are conveyed to the first drying tower 198. The stack 251 may be closed by a damper 252 and in normal operation there is a continuous flow of hot gases through the conduit 200 to the drying tower 198. The obnoxious gases and vapors from the first stage mill which pass upwardly through the separator 211 into the conduit 215 may also be delivered to the stack 251 or they may be conveyed to the furnace 237 where their obnoxious character is destroyed by the heat of the burning materials in the furnace chamber. For this purpose, the conduit 215 is continued to a point adjacent the furnace where it is led through the side wall of the furnace chamber. At this point, the conduit 215 also communicates with a conduit 253 leading from a fan 254 which is driven by a motor 255 and which is adapted to draw air through a conduit 256 from the atmosphere. This fan 254 supplies any air which may be required for combustion within the furnace chamber in addition to that which is supplied by the conduit 240. Some of the obnoxious gases and vapors discharged by the fan 213 into the conduit 215 may be conveyed through a conduit 258 into an obnoxious vapor condenser and gas scrubber and separator 260 from which the unobjectionable gases are discharged through a conduit 261 into the stack 251. If desired, the conduit 262 may be connected between the conduit 258 and the stack 251 for conveying the gases directly to the stack without passing them through the scrubber 260. A damper 263 in the conduit 258 may be employed for shutting off the flow to the scrubber and causing all of the gases to pass through the conduit 215 to the furnace chamber and a damper 264 in the conduit 262 may be employed for shutting off the by-pass and causing the gases passing by the damper 263 to pass through the scrubber 260.

In the form of the invention shown in Fig. 1, the various electric motors which are employed for driving the different mills and fans may be connected in an electrical system, similar to that shown and described in our copending original application above referred to in order to prevent the delivery of wet sludge to the first mill 202 when the flow of hot gases thereto through the conduit 200 is discontinued for any reason or to bring about the stopping of either mill in the event that the exhaust fan associated therewith fails to operate. As in the first form of the invention described in said copending application, the damper 201 may be connected to be automatically closed in the event that there is a failure of the delivery of wet sludge to the mill 202.

In Fig. 2 of the drawings, there is illustrated a modification of a portion of the apparatus illustrated in Fig. 1. This modified form is intended for use when the apparatus is to be employed for treating garbage alone, although it might be employed when any other single form of waste material is to be treated. As illustrated in Fig. 2, the hopper 545 is adapted to receive the garbage or other waste material 546 and to deliver it onto the endless belt 547ª of a magnetic separator 547. This belt 547ª passes over pulleys 547ᵇ and 547ᶜ, the latter of which is provided with magnets around its periphery, as in the form of the invention described above, so that any iron, steel, or other magnetizable material contained in the garbage or the like, is attracted to the pulley and carried around beneath the pulley with the result that it is separated from the non-metallic waste material which drops into a hopper 548. The magnetizable material which is carried beneath the pulley 547ᶜ finally separates from the belt in the manner described above and drops by gravity into the hopper 549, being thus separated from the combustible material. The waste material which is received in the hopper 548 falls downwardly into a pulverizer 550 having mounted therein a power driven shaft 550ª having fixed thereon one or more disks 550ᵇ provided with pivoted beaters 550ᶜ which normally extend radially outward under the action of centrifugal force and pulverize the waste material as it moves downwardly through the casing of the pulverizer. At the bottom of the pulverizer, the material passes through a grate 550ᵈ into a rotary screw conveyor 551 which is driven by a motor 552. The screw conveyor 551 discharges the material into the upper end of a drying tower 553 provided with a rotary chopping device 554 and a hot air inlet 555. This tower 553 may deliver the material to a pulverizer and dryer 556 and the succeeding stages of the process may be carried out in the manner described above in connection with the form of construction shown in Fig. 1. This modified form of arrangement is therefore capable of use in the preliminary stages of a process in which garbage alone or any other single form of waste is to be treated.

Although one form of apparatus has been shown and described in connection with the disclosure of a modification of a portion of this apparatus, it will be understood that the apparatus of the present invention may have various forms and that the improved method herein described may be modified in various ways without departing from the scope of the appended claims.

We claim:

1. The method of treating sewage waste and garbage waste, which consists in mixing the solid material of the sewage waste with the garbage and adding thereto a quantity of dried material from a later stage of the process, comminuting this mixture and drying it in the presence of hot gases, returning a part of the dried mixture to mix with the garbage and solid sewage waste, burning the remainder of the dried mixture, and utilizing the heat of combustion for supplying said hot gases.

2. The combination in apparatus for disposing of garbage waste and the like, of means for separating metallic objects from said waste, means for pulverizing said waste, drying tower, means for delivering said pulverized waste to said drying tower, means for further pulverizing said material in said drying tower, and a pulverizing mill adapted to receive said material from said tower.

WILLIAM A. DUNDAS.
PHILIP HARRINGTON.